United States Patent

Oelsch

[19]

[11] Patent Number: 5,977,675
[45] Date of Patent: Nov. 2, 1999

[54] SPINDLE-DRIVE MOTOR WITH BUSHING

[75] Inventor: Juergen Oelsch, Hohenroth, Germany

[73] Assignee: Precision Motors Deutsche Minebea GmbH, Germany

[21] Appl. No.: 09/128,365

[22] Filed: Aug. 3, 1998

[30] Foreign Application Priority Data

Aug. 2, 1997 [DE] Germany .............. 197 33 566

[51] Int. Cl.$^6$ ............................ H02K 5/16
[52] U.S. Cl. .................. 310/90; 310/91; 310/67 R; 310/88
[58] Field of Search ................. 310/67 R, 90, 310/91, 88; 348/276; 360/98.07, 99.04, 99.08; 384/477, 480

[56] References Cited

U.S. PATENT DOCUMENTS

| 4,535,373 | 8/1985 | Schuh | 360/97 |
| 5,166,565 | 11/1992 | Katsuzawa et al. | 310/90 |
| 5,325,004 | 6/1994 | Mori et al. | 310/67 R |
| 5,463,511 | 10/1995 | Nakano et al. | 360/99.08 |
| 5,485,331 | 1/1996 | Dunfield et al. | 360/99.08 |
| 5,596,235 | 1/1997 | Yazaki et al. | 310/67 R |
| 5,598,047 | 1/1997 | Sakuragi et al. | 310/67 R |

FOREIGN PATENT DOCUMENTS

| 3419814 | 11/1985 | Germany | G11B 19/20 |
| 4019658 | 1/1991 | Germany | H02K 5/16 |
| 3731141 | 6/1996 | Germany | G11B 19/20 |

*Primary Examiner*—Nestor Ramirez
*Assistant Examiner*—Saeed Ghahramani
*Attorney, Agent, or Firm*—Baker & Maxham

[57] ABSTRACT

A spindle-drive motor, especially for driving a hard drive, with a stator, a rotor, an axle between them having at least one bearing, and a drive, where the rotor or stator is provided with a bushing which accommodates at least one bearing. The bushing and bearing together form a sealing gap which seals the rotor and the stator with respect to each other.

17 Claims, 4 Drawing Sheets

SPINDLE-DRIVE MOTOR WITH BUSHING

BACKGROUND OF THE INVENTION

1. Field of the Invention

The present invention generally relates to a spindle-drive motor with a supporting bushing, and more particularly to such a motor where the bushing and a bearing form a sealing gap which seals the rotor and stator with respect to each other.

2. Discussion of the Related Art

Spindle-drive motors of the type of the present invention have become known which have a winding stack consisting of a laminated core and windings arranged in a stator, and a rotor which is rotatably mounted on an axle by means of bearings spaced a distance apart. Such spindle-drive motors consist in a traditional manner of a stator which is fixedly attached to the axle, with the bearings being mounted on the axle and in turn connected to the rotatable rotor.

SUMMARY OF THE INVENTION

A primary purpose of the present invention is to provide for the use of a bushing which accommodates the two bearings and optionally a spacer ring, with the two bearings being pressed and/or glued with the spacer ring in the bushing and the bushing being connected in turn with its outer radial part to the rotor or stator, depending on the design.

It is important with the present invention that a bushing, made preferably of a plastic material, be arranged between the rotatable part of the bearing and the rotor. This bushing serves as an assembly aid and is installed into the motor as a lost empty bushing. This ensures that the alignment of the bearing to the bushing on the one hand and of the bushing to the axle on the other hand is always maintained.

Another advantage of using a bushing of a plastic material is that a noise suppression effect is achieved. Since the bushing surrounds the ball bearings radially on the outside according to the present invention, this is a cup-shaped arrangement in which the ball bearings are accommodated, so that this cup made of plastic suppresses the noises coming from the bearings.

Another advantage of the present invention is that this bearing can also be designed as a sealing arrangement toward the axle, if the bushing is fixedly connected to the rotor. The section of this bushing next to the axle can then be designed as a gasket arrangement, preferably a labyrinth gland.

Another advantage of this arrangement is that the bushing can also be anchored in the correct position in the axial direction in the rotor when corresponding recesses and stops which interact with the bushing are present in the rotor, so that the bushing can also be mounted in the correct position in the rotor. This guarantees an allocation of the parts of the rotor to the bushing and of the bearings to the axle in the correct positions.

The design of the labyrinth gland in one piece with the material of the bushing yields the advantage of combining parts. It is known in the related art that the labyrinth gland can be connected to the rotor as a separate ring, so a separate part is necessary, creating the necessity of connecting this ring separately to the rotor by adhesive gaps. However, such adhesive gaps increase the imbalance of the rotor. This is avoided according to the present invention by the fact that the labyrinth gland is integrated into the bushing itself, so that a separate adhesive gap is avoided. This greatly reduces the imbalance of the rotor.

The efficacy of this gasket (labyrinth gland) is increased because the packing gap is greatly reduced, and the above-mentioned adhesive gaps are eliminated since the gasket is designed directly in one piece with the bushing and of one material.

Another advantage of the proposed solution is that due to the axial fixation of the bearings in the bushing according to the present invention, axial run-out of the rotor, and thus necessarily axial run-out of the data carrier (hard drive) which is fixedly connected to the rotor, are reduced.

The bushing may have many different designs. It may be cup shaped and have one or more axial flanges. It may also be designed without an axial flange.

BRIEF DESCRIPTION OF THE DRAWING

The objects, advantages and features of the invention will be more clearly perceived from the following detailed description, when read in conjunction with the accompanying drawing, in which.

DETAILED DESCRIPTION OF THE PREFERRED EMBODIMENTS

Figure 1:
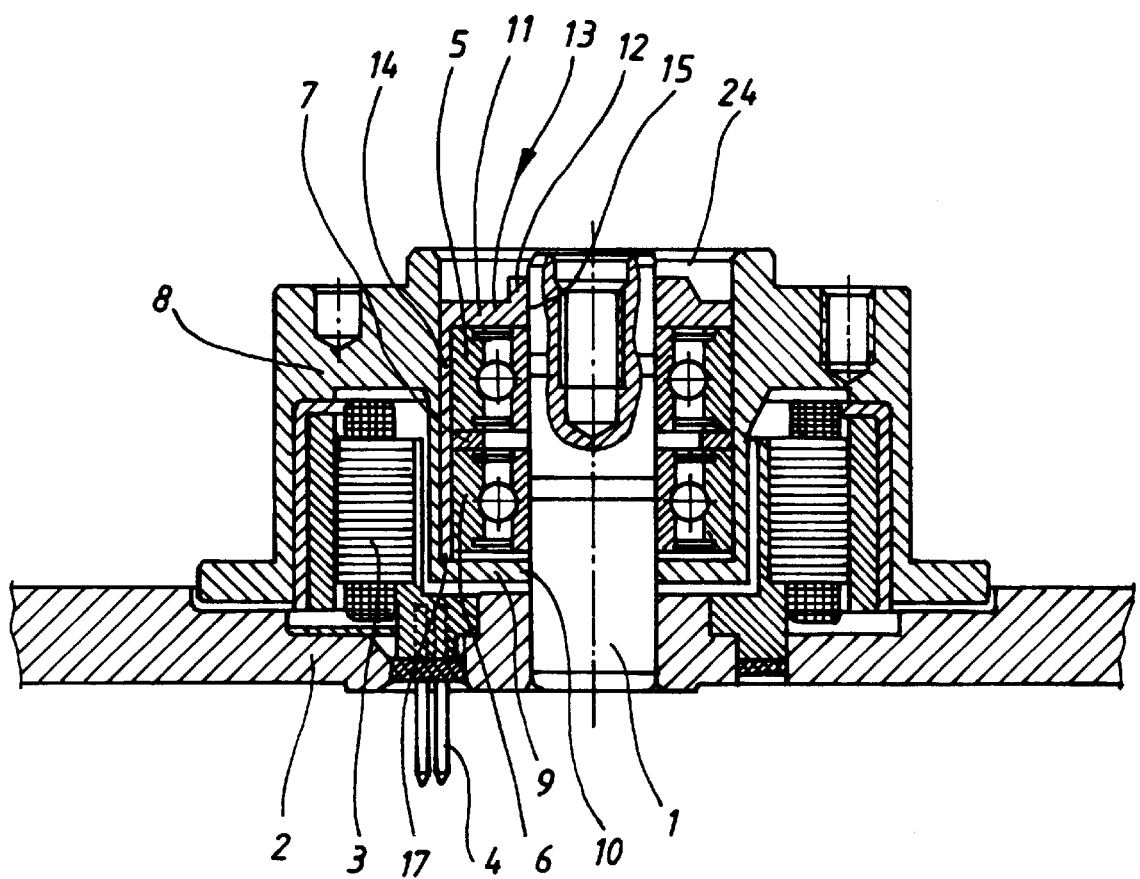
FIG. 1 is a sectional view through a spindle-drive motor with bushing in a first embodiment according to the present invention.

In the drawing figures described below, the same parts are provided with the same reference numerals to eliminate the need for a separate description for each element in each drawing.

With respect now to the drawing, and more particularly to FIG. 1, the spindle-drive motor consists of axle 1 which is fixedly connected to stator 2. Stator 2 here is designed as a disk-shaped part and it has winding stack 3 which is connected into stator 2 with respective terminal pins 4.

Bearings 5, 6 are mounted on axle 1 with a mutual spacing between them, with spacer ring 7 arranged between the outer rings of this bearing. Rotor 8 consists of a cup-shaped part which defines a central, internal recess 24 into which bushing 11 is pressed and/or glued with an accurate fit.

Bushing 11 is preferably made of a plastic material, but it may just as well be made of a lightweight metal, copper or some other metallic material. In the embodiment shown here, bushing 11 has axial shoulder 12 which is arranged closely adjacent to the outside circumference of axle 1 and forms gasket 15 which is preferably designed as a labyrinth gland.

The axial shoulder 12 develops into horizontal flange 13 on the inner side of which the end face of top bearing 5 rests. This horizontal flange 13 in turn develops into vertical flange 14 which is glued and/or pressed to the respective recess 24 of the rotor.

At the bottom of recess 24 in rotor 8 is found horizontal shoulder 9 on which end face 17 of cup-shaped bushing 11 sits and acts there as a stop.

Bottom bearing 6, like top bearing 5, is glued and/or pressed onto the inside of flange 14 of bushing 11.

The end face of shoulder 9 of the rotor 8, which faces radially inwardly, forms gasket 10 with respect to axle 1, which is also preferably designed as a labyrinth gland.

Figure 2:
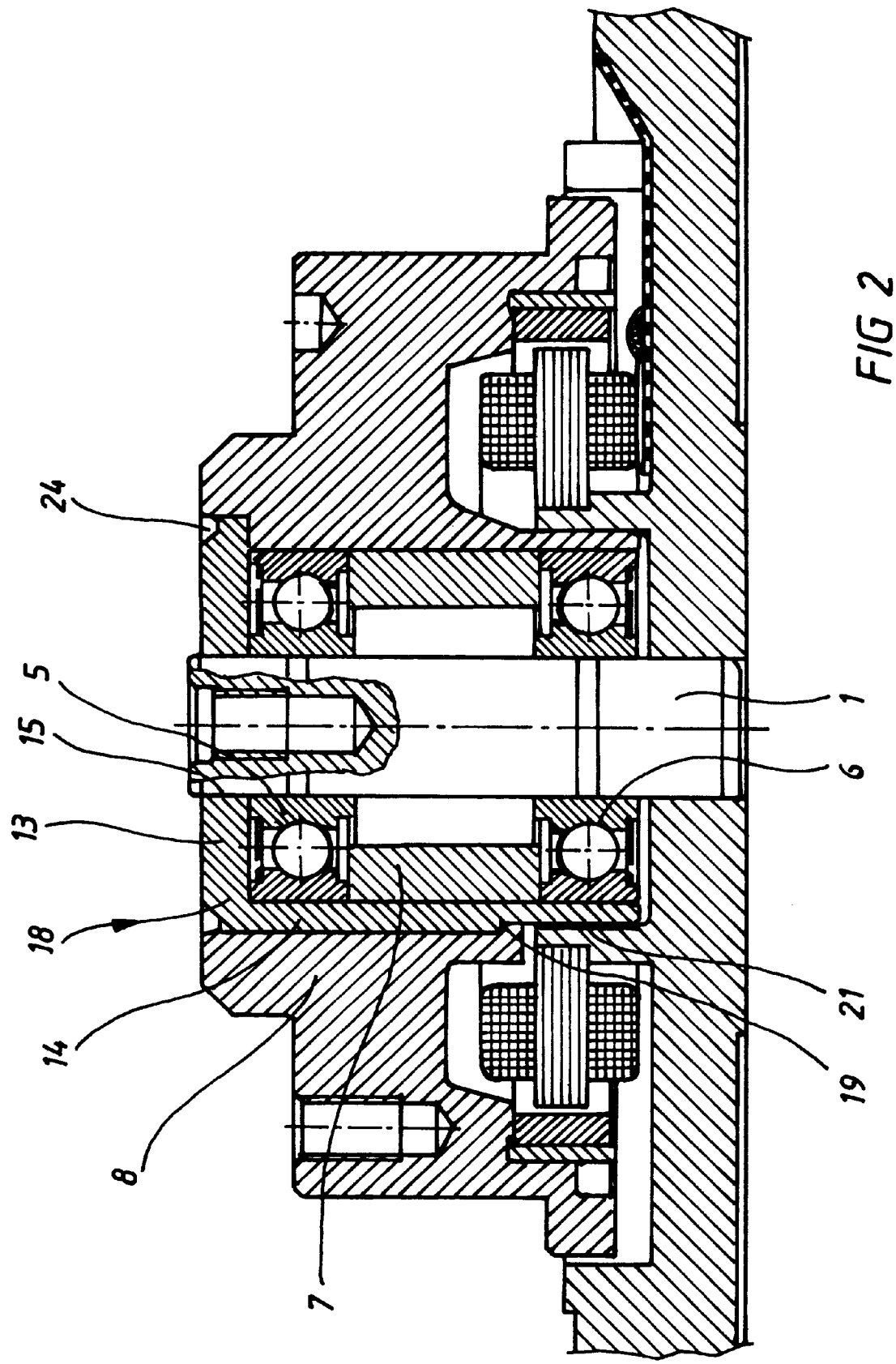
FIG. 2 is a sectional view through a spindle-drive motor with bushing of a second embodiment of the invention.

An alternative embodiment of bushing 11 is shown in FIG. 2 as bushing 18. It can be seen that gasket 15 is formed as the end face of horizontal flange 13 and faces axle 1. Vertical flange 14 has shoulder 19 which sits on a stop in rotor 8 and, together with the other part of the flange, forms a gasket 21 with the stator. In this embodiment, rotor 8 with its inner central recess 24 is also connected to vertical leg 14 of bushing 18.

Figure 4:
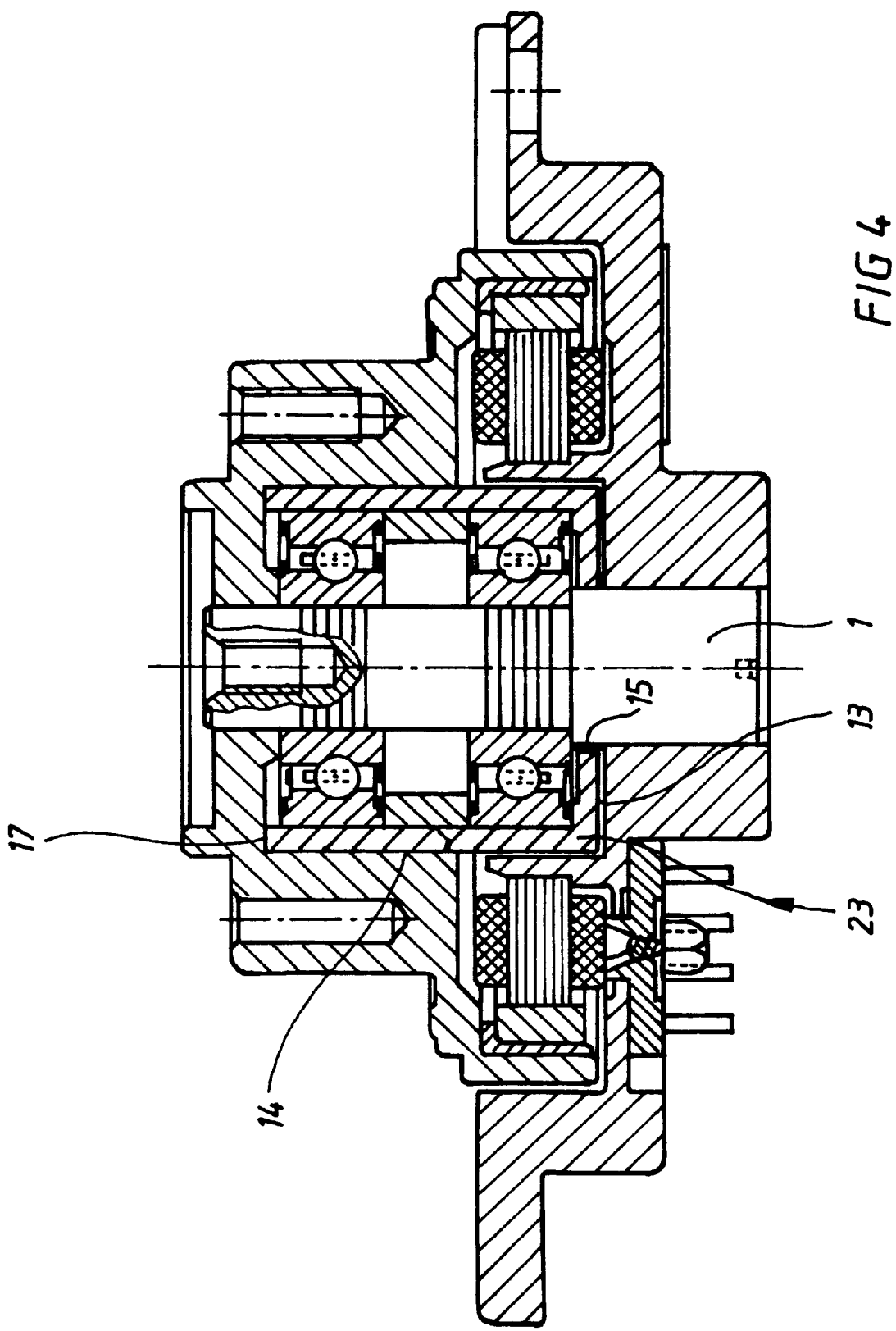
FIG. 4 is a sectional view through a spindle-drive motor with bushing of a fourth embodiment of the invention.

FIG. 4 shows a reversal of structural elements in comparison with FIG. 2. It can be seen here that cup-shaped bushing 23 can also be installed in the reversed order, so that horizontal flange 13 is at the bottom and, with its end face, directly forms gasket 15 with respect to axle 1.

Figure 3:
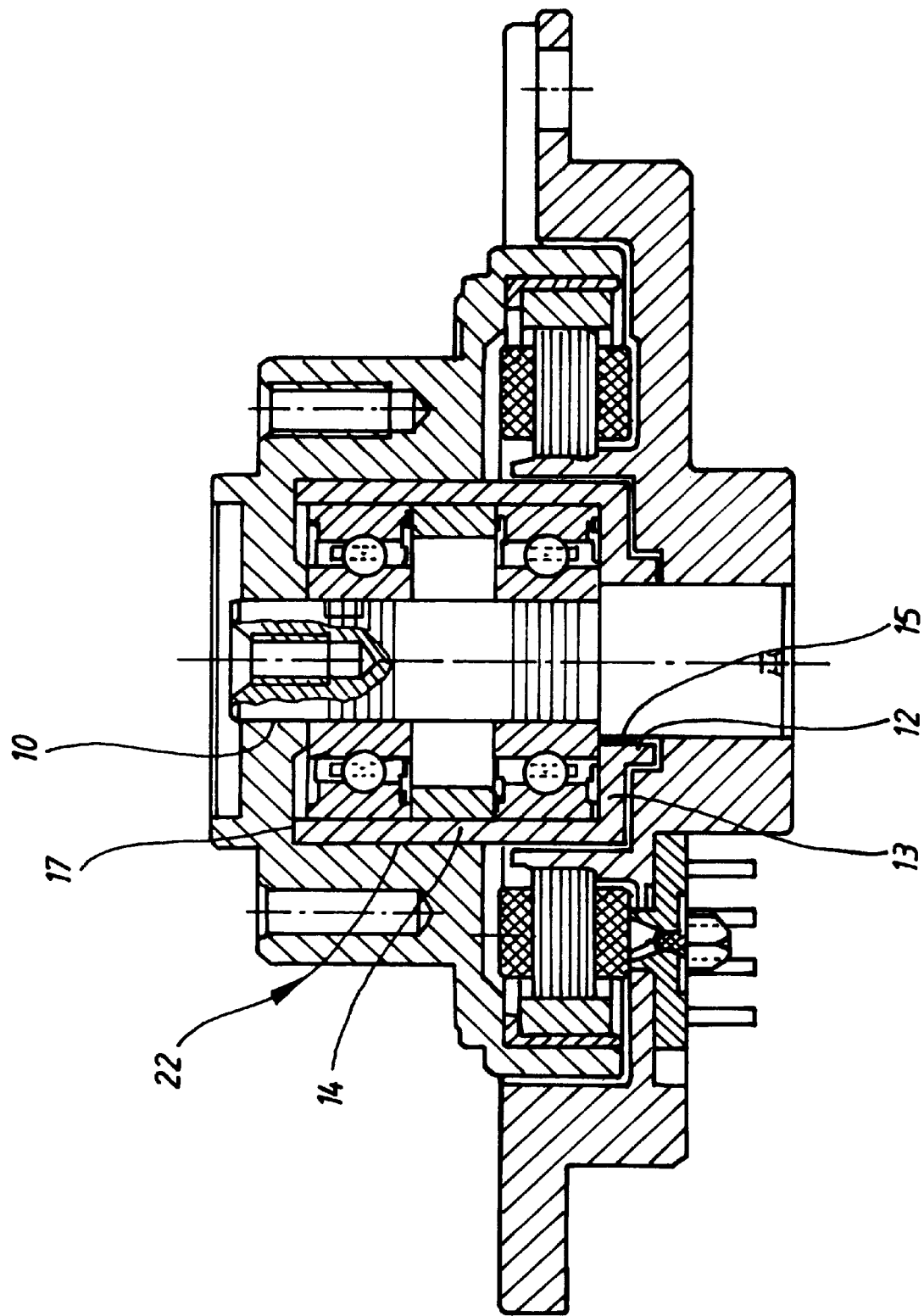
FIG. 3 is a sectional view through a spindle-drive motor with bushing of a third embodiment of the invention.

Bushing 22 shown in FIG. 3, like the bushing shown in FIG. 4, is installed in reversed order, so it is designed as a cup-shaped part but, in contrast with FIG. 4, it has axial shoulder 12 whose end face points radially inwardly and forms gasket 15.

All embodiments have in common the fact that the bushing serves as a lost assembly aid, and bearing 5, which stands on the horizontal flange, is introduced into the bushing first and is connected to the bushing, then spacer ring 7 is inserted and next the other bearing 6 is inserted, and these three parts are connected to the bushing by the aforementioned fastening means. Next, the axle is installed and centered in the correct position relative to the bushing.

In another preferred embodiment, first top bearing 5 is mounted in the proper position on the axle 1, as seen in FIG. 2. Then the bushing 18 is placed on top bearing 5 and horizontal flange 13 is connected to bearing 5. Then spacer ring 7 is inserted into the bushing and next bottom bearing 6 is inserted. All parts are fixedly connected to bushing 18. Next, the completed part is connected to rotor 8 and finally axle 1 is fixedly connected to stator 2 in the proper position.

Thus, bearings 5, 6, optionally together with spacer ring 7, are inserted into bushing 11, 18, 22, 23 and then connected together with the bushing to axle 1 and rotor 8 or stator 2. In this way, accuracy in assembly is greatly increased, and at the same time the bearings are aligned much better with one another than in the past.

The term "connected" as used herein is understood to refer to all known fastening means, namely pressing, wedging, gluing, shrinking, welding and the like.

In view of the above description it is possible that modifications and improvements will occur to those of at least ordinary technical skill in this technical field which are within the scope of the accompanying claims. The invention is to be limited only by the spirit and scope of the claims herein.

What is claimed is:

1. A spindle-drive motor, especially for driving a hard drive, with a stator, a rotor, a stationary axle in between, and a drive, said motor comprising:

a bearing; and a bushing which accommodates said bearing, said bushing being selectively mounted in the rotor or the stator;

said bushing together with said bearing forms a sealing gap which seals the rotor and the stator with respect to one another.

2. The spindle-drive motor according to claim 1, wherein said bearing comprises two bearing elements spaced a distance apart by means of a spacer ring.

3. The spindle-drive motor according to claim 1 or 2, wherein said bushing is designed essentially in a cup shape.

4. The spindle-drive motor according to claim 3, wherein said bushing is provided with a flange which extends in the longitudinal direction of said bushing.

5. The spindle-drive motor according to claim 3, wherein said bushing is formed as a labyrinth gland with respect to the axle.

6. The spindle-drive motor according to claim 3, wherein said bushing is made of a plastic material.

7. The spindle-drive motor according to claim 3, wherein said bushing is shaped and configured to have a vibration damping effect.

8. The spindle-drive motor according to claim 1 or 2, wherein said the bushing is provided with a flange which extends in the longitudinal direction of said bushing.

9. The spindle-drive motor according to claim 8, wherein said bushing is formed as a labyrinth gland with respect to the axle.

10. The spindle-drive motor according to claim 8, wherein said bushing is made of a plastic material.

11. The spindle-drive motor according to claim 8, wherein said bushing is shaped and configured to have a vibration damping effect.

12. The spindle-drive motor according to claim 1 or 2, wherein said bushing is formed as a labyrinth gland with respect to the axle.

13. The spindle-drive motor according to claim 12, wherein said busing is made of a plastic material.

14. The spindle-drive motor according to claim 12, wherein said bushing is shaped and configured to have a vibration damping effect.

15. The spindle-drive motor according to claim 1 or 2, wherein said bushing is made of a plastic material.

16. The spindle-drive motor according to claim 15, wherein said bushing is shaped and configured to have a vibration damping effect.

17. The spindle-drive motor according to claim 1 or 2, wherein said bushing is shaped and configured to have a vibration damping effect.

* * * * *